(12) United States Patent
Cruaud

(10) Patent No.: US 12,269,773 B2
(45) Date of Patent: Apr. 8, 2025

(54) GRAINS WHICH CAN BE ASSEMBLED WITH EACH OTHER TO FORM GRANULES, GRANULES OBTAINED, MANUFACTURING METHODS AND USE OF THE GRAINS AND GRANULES IN THE FIELD OF BUILDING AND PUBLIC WORKS

(71) Applicant: William Francis Cruaud, Chalonnes-sur-Loire (FR)

(72) Inventor: William Francis Cruaud, Chalonnes-sur-Loire (FR)

(73) Assignee: NÉOLITHE, Chalonnes-sur-Loire (FR)

( * ) Notice: Subject to any disclaimer, the term of this patent is extended or adjusted under 35 U.S.C. 154(b) by 832 days.

(21) Appl. No.: 17/310,548

(22) PCT Filed: Feb. 10, 2020

(86) PCT No.: PCT/IB2020/051023
§ 371 (c)(1),
(2) Date: Aug. 10, 2021

(87) PCT Pub. No.: WO2020/165729
PCT Pub. Date: Aug. 20, 2020

(65) Prior Publication Data
US 2022/0106228 A1 Apr. 7, 2022

(30) Foreign Application Priority Data
Feb. 11, 2019 (FR) ...................................... 1901351

(51) Int. Cl.
| | | |
|---|---|---|
| C04B 18/30 | (2006.01) | |
| C04B 14/06 | (2006.01) | |
| C04B 18/02 | (2006.01) | |
| C04B 28/02 | (2006.01) | |
| C04B 111/00 | (2006.01) | |

(52) U.S. Cl.
CPC ............ *C04B 18/305* (2013.01); *C04B 14/06* (2013.01); *C04B 18/021* (2013.01); *C04B 28/02* (2013.01); *C04B 2111/00767* (2013.01)

(58) Field of Classification Search
None
See application file for complete search history.

(56) References Cited

U.S. PATENT DOCUMENTS

| | | | | |
|---|---|---|---|---|
| 4,211,738 A | * | 7/1980 | Genis | .................. C04B 20/1055 264/117 |
| 2018/0179107 A1 | * | 6/2018 | Gao | ...................... C04B 18/167 |

FOREIGN PATENT DOCUMENTS

| | | |
|---|---|---|
| AT | 516171 | 3/2016 |
| FR | 2 472 421 | 7/1981 |
| GB | 2 202 525 | 9/1988 |

OTHER PUBLICATIONS

International Search Report issued in PCT/IB2020/051023 dated May 15, 2020 (5 pages).
Written Opinion of the International Searching Authority issued in PCT/IB2020/051023 dated May 15, 2020 (6 pages).
Search Report and Written Opinion issued in French Patent Application No. 1901351 dated Dec. 9, 2019 (8 pages).

* cited by examiner

*Primary Examiner* — Michael Forrest
(74) *Attorney, Agent, or Firm* — NIXON & VANDERHYE

(57) ABSTRACT

Base grains intended to be assembled together to form granules for a composition of construction materials useful in the field of building, public works and civil engineering, characterised in that each base grain consists of a core formed by an agglomerate of fragments of compressed waste and associated with each other by a micro-concrete with a carbonated hydraulic binder which has undergone hydraulic setting, the core being enclosed in a shell formed by a reactive powder micro-concrete (RPMC) which has undergone hydraulic setting.

17 Claims, No Drawings

GRAINS WHICH CAN BE ASSEMBLED WITH EACH OTHER TO FORM GRANULES, GRANULES OBTAINED, MANUFACTURING METHODS AND USE OF THE GRAINS AND GRANULES IN THE FIELD OF BUILDING AND PUBLIC WORKS

This application is the U.S. national phase of International Application No. PCT/IB2020/051023 filed Feb. 10, 2020 which designated the U.S. and claims priority to FR Application No. 1901351 filed Feb. 11, 2019, the entire contents of each of which are hereby incorporated by reference.

BACKGROUND OF THE INVENTION

Field of the Invention

The present invention relates to the field of building and public works and, more particularly, to materials of the aggregate type which enter into the composition of building materials.

Description of the Related Art

Known aggregates have as their basic component an assembly of minerals and sometimes fossils. They are often derived from massive or fragmented rock and can be monomineral or polymineral.

Aggregates are commonly referred to as rock fragments intended to be used as components of materials necessary for the manufacture of public works, civil engineering works and building works.

Currently, aggregates are classified into three main families:
- there are the so-called "natural" aggregates which have not undergone any transformation other than mechanical;
- there are the so-called "artificial" aggregates which result from industrial processes involving thermal or other modifications;
- there are the so-called "alternative materials" aggregates, which are derived from inorganic materials previously used in construction. This category includes aggregates such as crushed concrete aggregates, bituminous chippings, etc.

In the field of aggregates, wastes such as clinker, kaolin sands, mine waste rock, crushed concrete, etc. have already been used.

SUMMARY OF THE INVENTION

The purpose of the present invention is to propose aggregates that incorporate waste, such as household waste, organic waste, industrial waste, sludge and sediment waste, thus responding to the problem of waste treatment, while presenting mechanical and physico-chemical characteristics suitable for use in the construction, public works and civil engineering sector, in particular by meeting the standard currently required in this sector.

The present invention therefore relates firstly to base grains to be assembled together to form granules for a composition of construction materials useful in the field of building, public works and civil engineering, characterised in that each base grain consists of a core formed by an agglomerate of fragments of compressed waste and associated with each other by a micro-concrete with carbonated hydraulic binder which has undergone hydraulic setting, the core being enclosed in a shell formed by a reactive powder micro-concrete (RPMC) which has undergone hydraulic setting.

The waste fragments can in particular be derived from waste selected from among household waste (HW), household refuse (HR), residual household refuse (RHR), mixtures of at least two of HW, HR and RHR, organic waste, industrial waste, sludge waste, or mixtures of these wastes, the fragments having in particular been subjected to an inerting treatment, in particular by a quicklime-based composition.

Household waste (HW) refers to waste resulting from the daily domestic activity of households and economic activities collected under the same conditions as these ones. This waste is collected by traditional residual household waste collection, by selective collections, by waste collection centres, by bulky waste collection and by green waste collection.

Household refuse (HR) refers to the waste resulting from the daily domestic activity of households and economic activities collected under the same conditions as these ones. This waste is collected by the traditional collection of residual household waste and by selective collections.

Residual household refuse (RHR) refers to the portion of mixed household waste after selective collection.

Household waste, household refuse and residual household refuse are, for France, products listed and standardised by the French Environment and Energy Management Agency (ADEME).

For example, the composition of RHR in France is as follows according to ADEME:
33% of organic waste;
13% of fine elements;
11% of paper;
11% of plastic material;
10% of sanitary textile;
6% of cardboard;
5% of glass;
3% of textile;
3% of fuels;
2.5% of metals; and
2.5% of composite materials these % being by weight.

Organic material waste can be, among other things, beet pulp and other processing waste from the agri-food industry.

Industrial waste can be constituted, among other things, by hyperbaric water jet cutting sands.

Sludge and sediment waste can be, among other things, sludge and sediment from dredging of harbours and channels, or sludge and sediment from wastewater treatment plants.

In accordance with particular embodiments of the present invention, the micro-concrete with a carbonated hydraulic binder, having undergone hydraulic setting during the formation of the grain cores, comprises the following components:
(a) at least one of carbonated cement, quicklime and slaked lime, in particular in an amount of 10 to 50 parts by weight;
(b) a sand-based aggregate with a particle size of less than 400 μm, in particular in an amount of 90 to 50 parts by weight;
(c) optionally, at least one concrete admixture in particular in an amount of up to 5 parts by weight, the parts by weight of (a), (b) and (c) relating to 100 parts by weight of (a)+(b), and the hydraulically set reactive powder micro-concrete (RPMC) for shell formation consists of the following components:

(d) at least one carbonated cement, in particular in an amount of 20 to 50 parts by weight;
(e) a sand-based aggregate with a particle size of less than 400 μm, in particular in an amount of 50 to 80 parts by weight;
(f) at least one siliceous filler with a particle size of less than 100 μm, selected in particular from sedimentary siliceous fillers, cristobalite, silica fume, amorphous silica fume, condensed silica fume, microsilica and nanosilica, in particular in an amount of 1 to 30 parts by weight;
(g) at least one concrete admixture in an amount of up to 5 parts by weight,
the parts by weight of (d), (e), (f) and (g) relating to 100 parts by weight of (d)+(e), The admixtures for concrete that can be used in the composition of micro-concretes and reactive powder micro-concretes (RPMC) can be selected from set accelerators, set retarders, air entrainers, plasticizers, including super-plasticizers, pigments, grinding agents, colloids and mass water repellents.

The micro-concrete binding the waste fragments can also be a reactive powder micro-concrete (RPMC) as defined above.

The weight ratio of waste fragments to micro-concrete for binding the waste fragments is in particular between 10:1 and 1:3.

The weight ratio of core to shell of a grain is in particular between 15:1 and 1:3, being in particular from 1:1 to 2:1.

In particular, the waste fragments can each have a larger dimension of at most 30 mm, being in particular 100 μm-5 mm; the cores can have a larger dimension of 100-500 mm; and the shells can have a thickness of 0.3 to 10 mm.

The grains can have any shape, such as spherical, spheroidal, parallelepipedic, cylindrical.

The present invention also relates to granules consisting in the assembly of at least two, in particular two to twenty, base grains as defined above, wherein the granules can take dimensions selected to form one of a set of granules whose dimensions are distributed according to a granulometric curve to form an aggregate advantageously complying with the NFP18-545 standard, and a set of granules, which added to another aggregate, such as a natural aggregate, form a mixed aggregate advantageously complying with the NFP18-545 standard.

Examples include the preparation of the following aggregates with a granulometric curve in accordance with NFP18-545:
aggregate called gravel 11/22;
mixed aggregate of secondary materials GNTB 0/20+ natural aggregate;
mixed aggregate of primary materials from all sources 0/130+ natural aggregate;
primary material aggregate 100/300.

The base grains of a granule can be assembled by one of pressing, gluing and bonding with a hydraulically set, carbonated hydraulic binder concrete, such as a micro-concrete or a reactive powder micro-concrete (RPMC), e.g. a RPMC as defined above, the assembly having in particular a lower compressive/impact strength than the base grains.

The skilled person knows how to select micro-concretes according to their compressive/impact strength.

Advantageously, the cores can have a compressive strength of at least 15 MPa, in particular at least 25 MPa; the grains can have a compressive strength of at least 25 MPa, in particular of at least 60 MPa; and the granules can have a compressive strength of at least 20 MPa, in particular of at least 45 MPa.

The present invention also relates to a process for manufacturing base grains, granules and aggregates as defined above, characterised in that it comprises the following successive steps:

shredding the waste in at least one stage to obtain the waste fragments;

optionally, inerting the waste fragments obtained, in particular with a quicklime composition;

mixing the waste fragments obtained with the composition of the micro-concrete with carbonated hydraulic binder, the possible admixtures and the quantity of water necessary for its hydraulic setting;

obtaining the grain cores by one of press-moulding into blocks which are optionally cut, press extrusion, and pelleting in a tabletting machine;

storing the grain cores for at least the time required for maturation, e.g. between 10 and 30 days;

coating, in order to obtain the grains, the grain cores obtained with the composition of the reactive powder micro-concrete (RPMC), the possible admixtures, and the quantity of water necessary for hydraulic setting of the latter, the coating being carried out, for example, by one of tumbling in a drum and spraying on the grain cores; storing the grains obtained at least for the time necessary for their maturation, for example between 10 and 30 days;

assembly the grains together to form granules, the latter being formed by the assembly of at least two grains, the assembly being carried out by one of pressure, gluing and bonding by a carbonated hydraulic binder concrete with the grains being mixed in a mixer with the composition of the concrete, the possible admixtures and the quantity of water necessary for hydraulic setting, then, when the concrete has caused the grains to adhere to one another, the grains are removed from the mixer by refusal, with controlling their size; and constitution of a set of granules of different dimensions to constitute an aggregate which advantageously meets the NFP18-545 standard, or which, mixed with another aggregate, will advantageously meet the NFP18-345 standard.

The invention also relates to the use of base grains, granules and aggregates as defined above, or prepared by the method as defined above, as components of a composition of construction materials in the field of building, public works and civil engineering, in particular for the construction of walls, floors, road metalling and all concrete works.

DESCRIPTION OF THE PREFERRED EMBODIMENTS

The following Examples illustrate the present invention without limiting its scope.

In these Examples, seven reactive powder micro-concretes (RPMC) with the compositions shown in Table 1 were used.

TABLE 1

| Composition per 100.00 parts by weight | RPMC1 | RPMC2 | RPMC3 | RPMC4 | RPMC5 | RPMC6 | RPMC7 |
|---|---|---|---|---|---|---|---|
| 52.5 cement | 34.00 | 23.00 | 30.00 | 20.00 | 23.00 | 25.00 | 15.00 |
| White sand from the Sablières de la Perche | 47.00 | 57.00 | 50.00 | 60.00 | 61.00 | 65.00 | 65.00 |
| Siliceous sedimentary filler[1] | 9.00 | 10.00 | 10.00 | 10.00 | 8.00 | 5.00 | 10.00 |
| Cristobalite[2] | 10.00 | 10.00 | 10.00 | 10.00 | 8.00 | 5.00 | 10.00 |
| Compressive strength class of RPMC | C65 | C45 | C50 | C45 | C50 | C70 | C45 |

[1]"Millisil C400" from SIFRACO/SIBELO
[2]"Farsil 10" from Silmer or "Christoballite" from Como Céramique
(3) The compressive strength class of concretes (including micro-concretes and reactive powder micro-concretes) is expressed as CX/Y, where C stands for concrete and X and Y stand for compressive strength in MPa at 28 days, measured on a cylindrical specimen and cubic specimen respectively.

In these Examples, the super-plasticizer marketed as "DYNAMON NRG 1045" by the Company "MAPEI" was also used as a liquid admixture to each RPMC, and, for the formation of the shells of the base grains, a mass water repellent marketed as "SIKACEM Hydrofuge liquide" by the Company "SIKA".

The maturation times described in these Examples are each of the order of 28 days, as it is well known in the field of building and public works.

EXAMPLE 1

Manufacture of a 40/80 Aggregate

A—Preparation of HR and RHR Fragments

In a hopper, the product of HR and RHR waste collection was introduced. This waste was transferred by conveyor belt to a shredder line with 2-axis rotary shears in order to obtain a material made up of pieces each with a maximum size of 2 cm.

The shredded material was then transferred to a drum mixer where it was combined with a quicklime composition to treat the organic parts of the HR and RHR to make them as inert as possible.

The processed material was then transferred to a series of industrial shredder lines with a maximum passing of 5 mm to obtain HR/RHR fragments with a larger size of 5 mm.

B—Preparation of Base Grain Cores

The HR and RHR fragments were then transferred by auger to a mixer wherein they were associated by mixing with RPMC1+ superplasticizer and water in the following proportions, in parts by weight:

| HR/RHR fragments | 90.00 |
|---|---|
| RPMC1 | 10.00 |
| Superplasticizer | 0.05 |
| Water | 5 |

The resulting mixture was then transferred to an automated moulding line to produce 1 m×1 m slabs of 18 mm thickness and 2.5 density under hydraulic press.

The resulting slabs were stored for use after a period of time at least equal to their maturation time.

The slabs were then cut into parallelepipedic pieces of 18 mm side length.

These pieces constitute the base grain cores according to the present invention.

C—Manufacture of Base Grains

Each of the resulting cores was coated by rolling in a Rotomat-type drum with a 1 mm thick shell of RPMC1, evenly distributed over the surface of each grain core.

For this purpose, the grain cores were mixed with a mixture of RPMC1+ superplasticizer+mass water repellent and water in the following proportions, in parts by weight:

| Grain cores | 150 |
|---|---|
| RPMC1 | 100 |
| Superplasticizer | 0.05 |
| Mass water repellent | 0.05 |
| Water | 12 |

The resulting basic grains were stored for use after a period of time at least equal to their maturation time.

D—Manufacture of a 40/80 Aggregate

The base grains obtained in C were transferred by conveyor belt to a refusal mixer in which a mixture of RPMC2+ superplasticizer and water was added in the following proportions, in parts by weight

| Base grains | 75 |
|---|---|
| RPMC2 | 25 |
| Superplasticizer | 0.05 |
| Water | 15 |

The resulting aggregates were stored for use after a period of time at least equal to their maturation time.

As RPMC2 is less resistant than MBPR1, the base grains do not disintegrate if the aggregate breaks.

EXAMPLE 2

Manufacture of a 8/12 Aggregate

A—Preparation of HR and RHR Fragments

The procedure was as in Example 1,A, except that after treatment with the quicklime composition, the treated material was transferred to a series of industrial shredders with a maximum passing of 1 mm, to obtain HR/RHR fragments with a larger size of 1 mm.

B—Preparation of Base Grain Cores

The procedure was the same as in Example 1, B, except that RPMC3 was used, the mixing proportions in the mixer being:

| HR/RHR fragments | 85 |
|---|---|
| RPMC3 | 15 |
| Superplasticizer | 0.5 |
| Water | 8 | and that once the mixture was made, it was transferred to a hydraulic press extruder with a 3 mm grid to make cylindrical grain cores of 3 mm thickness and 2.5 density.

The resulting grain cores were stored for use after a period of time at least equal to their maturation time.

C—Manufacture of Base Grains

The procedure was as in Example 1,C, except that the mixing proportions were as follows:

| | |
|---|---|
| Grain cores | 170 |
| RPMC3 | 120 |
| Superplasticizer | 0.1 |
| Mass water repellent | 0.05 |
| Water | 7 |

D—Manufacture of a 8/12 Aggregate

The procedure was as in Example 1,D, except that RPMC4 was used and the mixing proportions were as follows:

| | |
|---|---|
| Base grains | 70 |
| RPMC4 | 30 |
| Superplasticizer | 0.1 |
| Water | 10 |

As RPMC4 is less resistant than RPMC3, the base grains do not disintegrate if the aggregate breaks.

EXAMPLE 3

Manufacture of a 6/15 Aggregate

A—Preparation of HR and RHR Fragments

The procedure was as in Example 1,A, except that after treatment with the quicklime composition, the treated material was transferred to a series of industrial shredders with a maximum passing of 1 mm.

B—Preparation of Base Grain Cores

The procedure was as in Example 1,B, except that MBPRS was used, the mixing proportions in the mixer being:

HR/RHR fragments 75 . . .

| | |
|---|---|
| RPMC5 | 25 |
| Superplasticizer | 0.1 |
| Water | 9 | and that once the mixture was made, it was transferred to a 2 mm diameter tabletting machine to make cylindrical grain cores of 2 mm thick and 2.5 density.

The resulting grain cores were stored for use after a period of time at least equal to their maturation time.

C—Manufacture of Base Grains

The procedure was the same as in Example 1,C, except that RPMC6 was used and the mixing proportions were as follows:

| | |
|---|---|
| Grain cores | 150 |
| RPMC6 | 150 |
| Superplasticizer | 0.15 |
| Mass water repellent | 0.05 |
| Water | 9 |

D—Manufacture of a 6/15 Aggregate

The procedure was as in Example 1,D, except that RPMC7 was used and the mixing proportions were as follows:

| | |
|---|---|
| Base grains | 70 |
| RPMC7 | 30 |
| Superplasticizer | 0.05 |
| Water | 12 |

As RPMC7 is less resistant than RPMC6, the base grains do not disintegrate if the aggregate breaks.

The invention claimed is:

1. Base grains to be assembled together to form granules for a composition of construction materials useful in the field of building, public works and civil engineering, wherein each of the base grains consists of a core formed by an agglomerate of fragments of compressed waste associated with each other by a micro-concrete with carbonated hydraulic binder having undergone hydraulic setting, the core being enclosed in a shell formed by a reactive powder micro-concrete (RPMC) which has undergone hydraulic setting.

2. The base grains according to claim 1, wherein the waste fragments are derived from waste selected from household waste (HW), residual household waste (RHW), mixtures of at least two of HW and RHW, organic waste, industrial waste, sludge waste, or mixtures of wastes.

3. The base grains according to claim 1, wherein the micro-concrete with carbonated hydraulic binder, having undergone hydraulic setting during the formation of the grain cores, comprises the following components:
  (a) at least one of carbonated cement, quicklime and slaked lime, in an amount of 10 to 50 parts by weight;
  (b) a sand-based aggregate with a particle size of less than 400 µm, in an amount of 90 to 50 parts by weight;
  (c) optionally, at least one admixture for concrete in an amount of up to 5 parts by weight,
  the parts by weight of (a), (b) and (c) relating to 100 parts by weight of (a)+ (b),
  and wherein the hydraulically cured reactive powder micro-concrete (RPMC) for shell formation consists of the following components:
  (d) at least one carbonated cement, in an amount of 20 to 50 parts by weight;
  (e) a sand-based aggregate with a particle size of less than 400 µm, in an amount of 50 to 80 parts by weight;
  (f) at least one siliceous filler with a particle size of less than 100 µm, chosen from sedimentary siliceous fillers, cristobalite, silica fume, amorphous silica fume, condensed silica fume, microsilica and nanosilica, in an amount of 1 to 30 parts by weight;
  (g) at least one admixture for concrete in an amount of up to 5 parts by weight,
  the parts by weight of (d), (e), (f) and (g) relating to 100 parts by weight of (d)+ (e).

4. The base grains according to claim 1, wherein the weight ratio of waste fragments to micro-concrete for binding the waste fragments is between 10:1 and 1:3.

5. The base grains according to claim 1, wherein the weight ratio of core to shell of a grain is between 15:1 and 1:3.

6. The base grains according to claim 1, wherein the waste fragments each have a larger dimension of at most 30 mm, the cores have a larger dimension of 100-500 mm; and the shells have a thickness of 0.3 to 10 mm.

7. Granules consisting of the assembly of at least two base grains as defined in claim 1, the granules taking dimensions selected to form one of a set of granules whose dimensions are distributed according to a granulometric curve to form an aggregate, and a set of granules which, added to another aggregate, form a mixed aggregate.

8. The granules according to claim 7, wherein the base grains of a granule are assembled by one of pressing, gluing and bonding with a hydraulically set, carbonated hydraulic binder concrete, the assembly having a lower compressive/impact strength than the base grains.

9. Method for manufacturing granules as defined in claim 7, comprising the following successive steps:
- shredding the waste in at least one stage to obtain the waste fragments;
- optionally, inerting the waste fragments obtained;
- mixing the waste fragments obtained with the composition of the micro-concrete with carbonated hydraulic binder, the possible admixtures and the quantity of water necessary for its hydraulic setting;
- obtaining the grain cores by one of press-moulding into blocks which are optionally cut, press extrusion, and pelleting in a tabletting machine;
- storing the grain cores for at least the time required for maturation;
- coating, in order to obtain the grains, the grain cores obtained with the composition of the reactive powder micro-concrete (RPMC), the possible admixtures, and the quantity of water necessary for hydraulic setting, the coating being carried out by one of tumbling in a drum and spraying on the grain cores;
- storing the grains obtained at least for the time necessary for their maturation;
- assembling grains to form granules, the granules being formed by assembling at least two grains, the assembly being carried out by one of pressure, bonding and binding by a concrete with a carbonated hydraulic binder, with the grains being mixed in a mixer with the composition of the concrete, the possible admixtures and the quantity of water necessary for hydraulic setting, then, when the concrete has caused the grains to adhere to one another, the grains are removed from the mixer by refusal, while controlling their size; and
- optionally forming a set of granules of different sizes.

10. The base grains according to claim 3, wherein the micro-concrete binding the waste fragments is a reactive powder micro-concrete (RPMC).

11. The base grains according to claim 5, wherein the weight ratio of core to shell of a grain is between 1:1 to 2:1.

12. The base grains according to claim 6, wherein the waste fragments each have a larger dimension of 100 μm-5 mm.

13. The base grains according to claim 1, having a shape selected among spherical, spheroidal, parallelepipedic and cylindrical shapes.

14. The granules according to claim 7, wherein the other aggregate is a natural aggregate.

15. The granules according to claim 8, wherein the hydraulically set, carbonated hydraulic binder concrete is selected among the micro-concretes and the reactive powder micro-concretes.

16. The granules according to claim 7, wherein the cores of the base grains have a compressive strength of at least 15 MPa; the grains have a compressive strength of at least 25 MPa and the granules have a compressive strength of at least 20 MPa.

17. The granules according to claim 16, wherein the cores of the base grains have a compressive strength of at least 25 MPa; the grains have a compressive strength of at least 60 MPa; and the granules have a compressive strength of at least 45 MPa.

* * * * *